(12) United States Patent
Ramon et al.

(10) Patent No.: US 8,164,600 B2
(45) Date of Patent: Apr. 24, 2012

(54) METHOD AND SYSTEM FOR COMBINING IMAGES GENERATED BY SEPARATE SOURCES

(75) Inventors: Peter Gerard Paula Ramon, Kachtem (BE); Thierry Viktor Alma Nolf, Kortrijk (BE); Bart De Zwaef, Zottegem (BE); Geert Jules Georges Nuyttens, Bissegem (BE)

(73) Assignee: Barco NV, Kortrijk (BE)

( * ) Notice: Subject to any disclaimer, the term of this patent is extended or adjusted under 35 U.S.C. 154(b) by 1106 days.

(21) Appl. No.: 11/951,740

(22) Filed: Dec. 6, 2007

(65) Prior Publication Data
US 2009/0147004 A1  Jun. 11, 2009

(51) Int. Cl.
G09G 5/00 (2006.01)
(52) U.S. Cl. .................................. 345/639; 345/606
(58) Field of Classification Search .................. None
See application file for complete search history.

(56) References Cited

U.S. PATENT DOCUMENTS

| | | | | |
|---|---|---|---|---|
| 6,005,987 A * | 12/1999 | Nakamura et al. | ............ | 382/294 |
| 6,017,123 A * | 1/2000 | Bleha et al. | ..................... | 353/30 |
| 6,069,668 A * | 5/2000 | Woodham et al. | ............ | 348/578 |
| 6,097,833 A * | 8/2000 | Lobregt et al. | ................ | 382/130 |
| 6,115,022 A * | 9/2000 | Mayer et al. | .................. | 345/418 |
| 6,259,460 B1 | 7/2001 | Gossett et al. | | |
| 6,480,175 B1 * | 11/2002 | Schneider | ....................... | 345/32 |
| 6,695,451 B1 * | 2/2004 | Yamasaki et al. | ............... | 353/30 |
| 6,734,873 B1 | 5/2004 | Herf et al. | | |
| 6,848,792 B1 | 2/2005 | De Meerleer | | |
| 7,177,488 B2 | 2/2007 | Berkner et al. | | |
| 2003/0206179 A1 * | 11/2003 | Deering | ....................... | 345/589 |
| 2004/0062454 A1 * | 4/2004 | Komiya et al. | ............... | 382/284 |
| 2005/0117121 A1 | 6/2005 | Meerleer | | |
| 2010/0125356 A1 * | 5/2010 | Shkolnik et al. | ................ | 700/98 |

* cited by examiner

*Primary Examiner* — Andrew Wang
*Assistant Examiner* — David H Chu
(74) *Attorney, Agent, or Firm* — Ryan A. Schneider, Esq.; Troutman Sanders LLP

(57) ABSTRACT

A system and method for combining images generated by separate sources. The system comprises a plurality of video image data sources that generate separate video images. The video images are captured and scaled by image processing hardware to fit within the viewports of a target window generated by a computing device. The parameters of the viewports are associated with the parameters of the target window such that changes to the target window result in corresponding changes to the viewports. The method comprises scaling the separate images to fit within the viewports using redundant data within each video image to interpolate pixel data at the boundary regions of adjacent images to eliminate artifacts at the boundary regions.

30 Claims, 9 Drawing Sheets

METHOD AND SYSTEM FOR COMBINING IMAGES GENERATED BY SEPARATE SOURCES

BACKGROUND OF THE INVENTION

1. Technical Field

The embodiments of the present invention relate generally to the field of video image processing and, in particular to capturing, processing, and displaying images generated by separate sources.

2. Description of Related Art

Conventional image processing generally utilizes a single computing device having one or more graphics processing units (GPU), central processing units (CPU), and display devices, such as a monitor. Software applications running on the CPU can seamless adjust the resolution of the image generated by the GPU and display it on the monitor. Such resolution adjustments are easily accomplished since the image is entirely generated and processed within a single computing device having a CPU and GPU that function together.

Advanced image processing applications, such as virtual reality applications, simulators, and other large area displays require generating large images having very high resolutions, frame rates, or refresh rates. The high resolutions of such large images often exceed the graphical processing capacity of individual computing devices. In such applications, often an array of computing devices is employed, each having at least one CPU and/or GPU. Each computing device generates a single portion of the image at the desired resolution.

For example, in producing interactive video images of a simulated virtual environment, OpenGL or DirectX graphics systems may be employed on several separate computing devices. Each computing device runs a graphics system, which generates an image representative of a view point of the virtual environment at a particular desired resolution. The separate images are then combined by another computing device to produce a single larger image at the desired resolution.

A comparable situation can arise when transferring high resolution images to a computing device after compressing the image data. Most hardware and software codecs have limitations in terms of image size they can compress. Larger images can only be compressed by splitting up the original image in tiles and compressing each tile separately. After encoding, each of the compressed image tiles is transferred to one or more decoder devices that decompress the image and send it to an image combination module in order to display the different parts after decompressing as a single image at a required resolution. In such a situation, each compressed image tile can be considered as a separate source.

A problem arises when changing the size or resolution of the combined image is desired. The resolution of each individual image must be changed separately. Changing the resolution involves increasing or decreasing the total number of pixels that make up the image. When adding or subtracting pixels, the color assigned to each pixel of the new image is interpolated from the pixel data of the pixels in the corresponding area of the original image. This process generally produces an accurate rendering of the original image at a different resolution. However, the colors at the edges of the new image are often distorted since there are fewer pixels from which to interpolate pixel data. Depending on the desired resolution this may cause significant distortion. Additionally, when combining several separate images which have been individually resized, an artifact typically appears at the edges where the images are joined. This artifact is due to the edge pixels of each image having fewer adjoining pixels from which pixel data may be interpolated accurately, and thus the images do not have corresponding edge details. The artifact may also be due to the decompression of the separate images.

It would be beneficial to provide a method and system for combining images from separate sources to produce a larger image in a manner that does not produce artifacts when the resolution of the combined image is changed.

BRIEF SUMMARY OF THE INVENTION

Embodiments of the present invention are directed to a system and method for combining images generated by separate sources. In accordance with an exemplary embodiment, the system comprises a plurality of video image data sources that each generate a separate portion of a combined image. Each of the separate video images have an overlap area, which is a portion of an adjacent video image to provide redundant video data. The video image data sources send video images to image processing hardware, which captures and/or decompresses. The system further includes a video computing device which generates a target window and a plurality of viewports within the target window. The image processing hardware processes the video images such that the dimensions and resolutions of the images correspond to the dimensions and resolution of the viewports. The image processing hardware inserts the processed video images into the viewports of the target window to form a single coherent image. The system further includes a plurality of display devices for displaying the target window.

The viewports are preferably associated with the target window such that any changes to the dimensions and resolution of the target window result in corresponding and proportional changes to the viewports. As the user changes the dimensions or resolution of the target window the dimensions or resolution of the viewports will change correspondingly. Accordingly, the image processing hardware processes the separate video images so that the dimensions and resolution of the video images correspond to the newly resized viewports.

In accordance with an exemplary embodiment of the method implementing the system, the image processing hardware separately adjusts the dimensions and/or resolution of each individual image and combines the images to form a single larger image at the new size or resolution. The image data in the overlap area is used during the resealing of the images to accurately interpolate the pixel data of each of the displayed pixels of the newly resized image. Using non-displayed overlapping data for the interpolation of pixel data eliminates the boundary artifacts that are generated by conventional methods of image resealing. The viewports are permanently assigned a position and size relative to the target window, such that moving the target window moves the viewports and the video images inserted therein.

In an alternative embodiment, the pixel data of each of the displayed pixels in the overlap zone is calculated from the corresponding pixels of the rescaled original images, where the contribution of each of these corresponding pixels is a function of the position within the overlap zone. Further exemplary embodiments of the method are directed to employing the system substantially as described above.

These and other features as well as advantages, which characterize various exemplary embodiments of the present invention, will be apparent from a reading of the following detailed description and a review of the associated drawings.

DETAILED DESCRIPTION OF PREFERRED EMBODIMENTS

Figure 1:
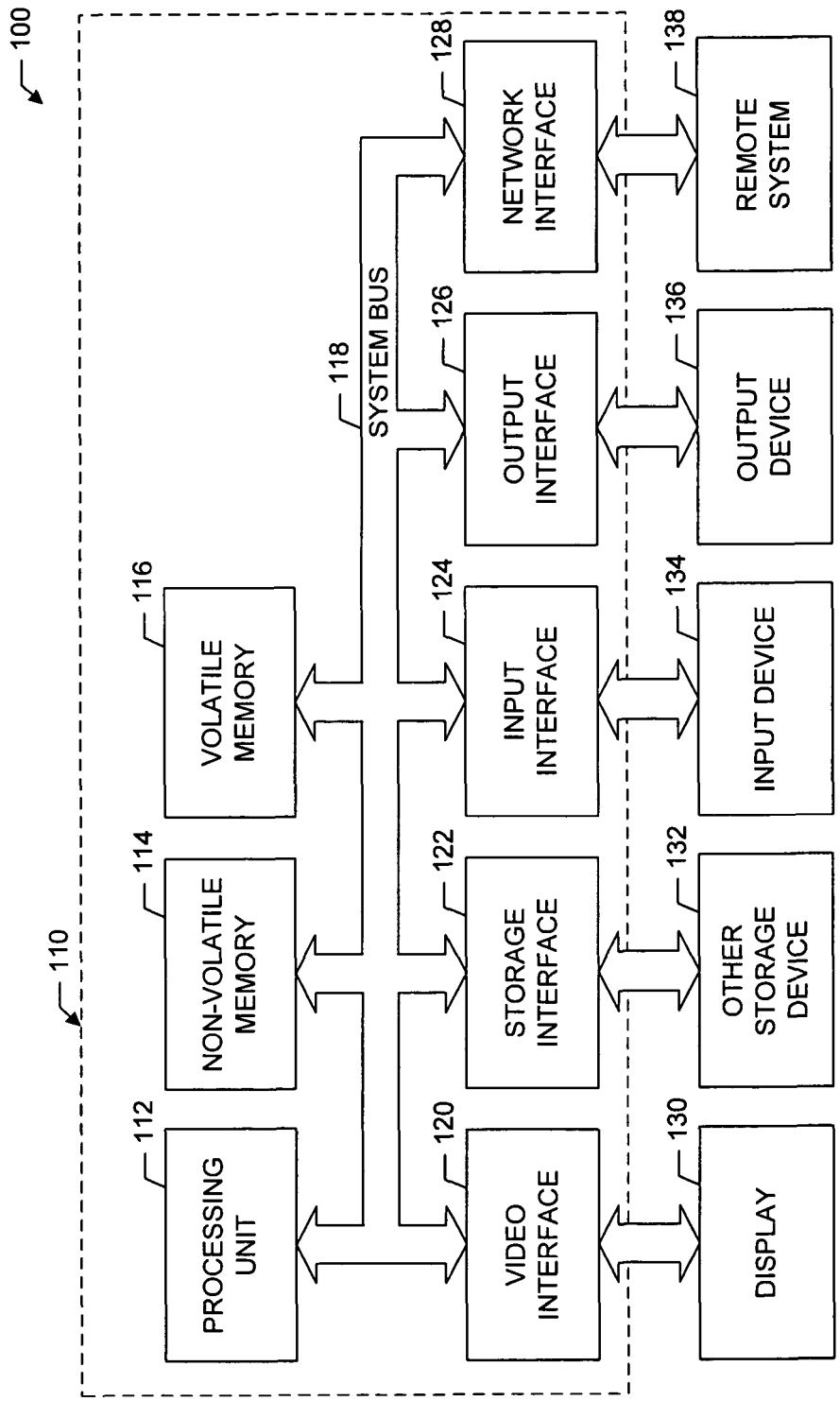
FIG. 1 illustrates a block diagram representative of an exemplary computing environment in which exemplary embodiments of the present invention may be implemented.

Referring now in detail to the drawing figures, wherein like reference numerals represent like parts throughout the several views, FIG. 1 illustrates a block diagram representation of an exemplary computing environment 100 in which the present invention may be implemented. Exemplary computing environments 100 may include, but are not limited to, personal computers, mainframe computers, servers, hand-held or laptop devices, mobile telephones, multiprocessor systems, microprocessor-based systems, set top boxes, programmable consumer electronics, network PCs, minicomputers, distributed computing environments that include any of the above systems or devices, and the like. However, it should be understood that the features and aspects of exemplary embodiments of the present invention may be implemented by or into a variety of systems and system configurations and any examples provided within this description are for illustrative purposes only.

FIG. 1 and the following discussion provide a general overview of a platform onto which exemplary embodiments of the present invention, or portions thereof, may be integrated, implemented and/or executed. Although in the context of portions of an exemplary environment, the invention may be described as consisting of instructions within a software program being executed by a processing unit, those skilled in the art will understand that portions of an exemplary embodiment of the present invention, or the entire invention itself may also be implemented by using hardware components, state machines, or a combination of any of these techniques. In addition, a software program implementing an embodiment of the present invention may run as a stand-alone program or as a software module, routine, or function call, operating in conjunction with an operating system, another program, system call, interrupt routine, library routine, or the like. The term program module may be used to refer to software programs, routines, functions, macros, data, data structures, or any set of machine readable instructions or object code, or software instructions that may be compiled into such, and executed by a processing unit 112.

Those skilled in the art will appreciate that the computing environment illustrated in FIG. 1 may take on many forms and may be directed towards performing a variety of functions. Generally, the computing environment illustrated in FIG. 1 may be any system that includes a computer processor. Examples of such forms and functions include, but are not limited to, personal computers, hand-held devices such as personal data assistants, note-book computers, mobile telephones, lap-top computers, mainframe computers, servers and a variety of other applications, each of which may serve as an exemplary environment for embodiments of the present invention.

The exemplary computing device 110 may comprise various components including, but not limited to, a processing unit 112, non-volatile memory 114, volatile memory 116, and a system bus 118 that couples the non-volatile memory 114 and volatile memory 116 to the processing unit 112. The non-volatile memory 114 may include a variety of memory types including, but not limited to, read only memory (ROM), electronically erasable read only memory (EEROM), electronically erasable and programmable read only memory (EEPROM), electronically programmable read only memory (EPROM), electronically alterable read only memory (EAROM), FLASH memory, bubble memory, battery backed random access memory (RAM), CDROM, digital versatile disks (DVD) or other optical disk storage, magnetic cassettes, magnetic tape, magneto-optical storage devices, magnetic disk storage or other magnetic storage devices, or any other medium which may be used to store the desired information. The non-volatile memory 114 may provide storage for power-on and reset routines (bootstrap routines) that are invoked upon applying power or resetting the computing device 110. In some configurations the non-volatile memory 114 may provide the basic input/output system (BIOS) routines that may be utilized to perform the transfer of information between elements within the various components of the computing device 110.

The volatile memory 116 may include, but is not limited to, a variety of memory types and devices including, but not limited to, random access memory (RAM), dynamic random access memory (DRAM), bubble memory, registers, or the like. The volatile memory 116 may provide temporary storage for routines, modules, functions, macros, data etc. that are being or may be executed by, or are being accessed or modified by, the processing unit 112.

Alternatively, the non-volatile memory 114 and/or the volatile memory 116 may comprise a remote storage facility accessible through a wired and/or wireless network system. Additionally, the non-volatile memory 114 and/or the volatile memory 116 may comprise a memory system comprising a multi-stage system of primary and secondary memory devices, as described above. The primary memory device and secondary memory device may operate as a cache for the other or the second memory device may serve as a backup to the primary memory device. In yet another arrangement, the non-volatile memory 114 and/or the volatile memory 116 may comprise a memory device configured as a simple database file or as a searchable, relational database using a query language, such as SQL.

The computing device 110 may access one or more external display devices 130 such as a CRT monitor, LCD panel, LED panel, projector display, electro-luminescent panel, or other display device, for the purpose of providing information or computing results to a user. In some embodiments, the external display device 130 may actually be incorporated into the product itself. The processing unit 112 may interface to each display device 130 through a video interface 120 coupled to the processing unit 112 over the system bus 118.

The computing device 110 may send output information, in addition to the display 130, to one or more output devices 136 such as a speaker, modem, printer, plotter, facsimile machine, RF or infrared transmitter, computer or any other of a variety of devices that may be controlled by the computing device 110. The processing unit 112 may interface to each output device 136 through an output interface 126 coupled to the processing unit 112 over the system bus 118.

The computing device 110 may receive input or commands from one or more input devices 134 such as a keyboard, pointing device, mouse, modem, RF or infrared receiver, microphone, joystick, track ball, light pen, game pad, scanner, camera, computer or the like. The processing unit 112 may interface to each input device 134 through an input interface 124 coupled to the processing unit 112 over the system bus 118.

It will be appreciated that program modules implementing various embodiments of the present invention may be stored in the non-volatile memory 114, the volatile memory 116, or in a remote memory storage device accessible through the output interface 126 and the input interface 124 or the storage interface 122. The program modules may include an operating system, application programs, other program modules, and program data. The processing unit 112 may access various portions of the program modules in response to the various instructions contained therein, as well as under the direction of events occurring or being received over the input interface 124.

The computing device 110 may provide data to and receive data from one or more other storage devices 132, which may provide volatile or non-volatile memory for storage and which may be accessed by computing device 110. The processing unit 112 may interface to each storage device 132 through a storage interface 122 over the system bus 118.

The interfaces 120, 122, 124, 126, and 128 may include one or more of a variety of interfaces, including but not limited to, parallel or serial bus interfaces such as PCI, PCIx, PCIe, IDE and SATA, cable modems, DSL, Ti, V series modems, an RS-232 serial port interface or other serial port interface, a parallel port interface, a universal serial bus (USB), a general purpose interface bus (GPIB), an optical interface such as infrared or IrDA, an RF or wireless interface such as Bluetooth, or other interface.

Figure 2:
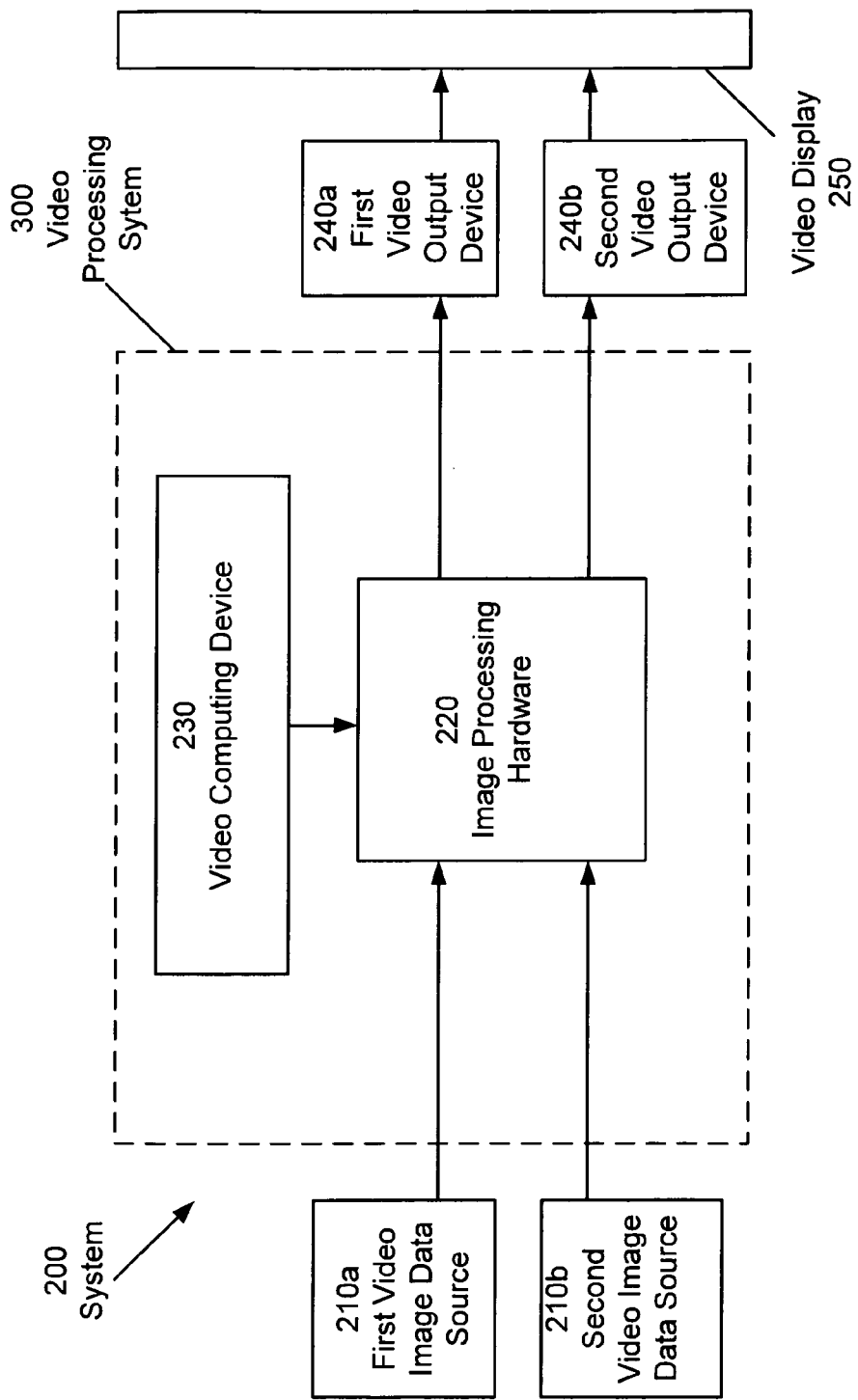
FIG. 2 illustrates a block diagram of the system according to an embodiment of the present invention.

FIG. 2 illustrates a block diagram of a system 200 according to an exemplary embodiment of the present invention. The system 200 preferably comprises a first video image data source 210a and a second video image data source 210b in connection with image processing hardware 220. In other contemplated embodiments, the system may comprise additional video image data sources. The video image data sources 210a and b may be selected from a plurality of sources such as a computing device, digital video camera, camcorder, DVD player, VCR player, HD player, solid state drive player, television receiver, satellite receiver, gaming station, or other device capable of generating video data. The video data from the video image data sources 210a and b may be transmitted to the image processing hardware 220 over cables such as RGB, DVI, Dual DVI, HDMI, FireWire, DisplayPort, component, or other suitable cables for transmitting video data. In other contemplated embodiments, the video data could be transmitted from the video image data sources 210a and b to the image processing hardware wirelessly by utilizing infrared, Bluetooth, 802.11g, or other suitable wireless protocols. In further contemplated embodiments of the present invention, the video input source may be a remote device, and the video data would be transmitted over the internet or over a local area network (LAN) and received by the image processing hardware 220 through a network cable, such as an RJ45 cable. In contemplated embodiments, the video data transmitted over the internet may be in an MPEG, MPEG2, Mpeg4, JPEG 2000, JPEG-LS, MPEG, H.264, PCM, DPCM or other suitable format.

Separate video image data sources 210a and b may be employed to increase video processing capacity. Each of the video image data sources 210a and b may generate a portion of a desired image. For example, the first video source 210a may generate the left half of the image, and the second video source 210b may generate the right half of the image. The two images would then be processed and combined by the video processing system 300 as discussed in detail below. Such and arrangement is preferable because the resolution of the desired image may be too large for a single device to reliably generate the entire image.

The images generated by the video image data sources 210a and b may have overlapping areas. For example, the right image may comprise a vertical column at its left edge comprising the same video data that is present in a vertical column at the right edge of the left image. In such and arrangement, the two images cannot simply be placed side by side to form a single coherent image. Rather, the images may be overlaid such that the common video data is not displayed twice. In other contemplated embodiments, such an overlapping arrangement can be employed for more than two generated images, and may comprise overlapping video data at any of the four sides of each image.

The image processing hardware 220 preferably is connected to a processing device such as a central processing unit (CPU), microcontroller, microprocessor, application-specific integrated circuit (ASIC), a digital signal processor (DSP), system-on-a-chip (SoC), Field-programmable gate array (FPGA), programmable-logic device (PLD), programmable electrically erasable logic (PEEL), programmable array logic (PAL), generic array logic (GAL), or another suitable device. The image processing hardware 220 is preferably in communication with a video computing device 230 via suitable video data cables such as discussed above. In other contemplated embodiments, the image processing hardware 220 and video computing device 230 may be in wireless or wired communication using a suitable bus or network protocol as discussed above. In further contemplated embodiments, the image processing hardware 220 may be a card that can be plugged into an interface slot of the video computing device 230. The video computing device 230 can be substantially similar to computing device 110. In other contemplated embodiments of the present invention, the image processing hardware 220 may be housed within the same structure as the video computing device 230. In further contemplated embodiments, the image processing hardware 220 may be integrated with the video computing device 230 rather than being a standalone device.

The video computing device 230 preferably runs a windows based operating system such as Microsoft Windows, MacOS, Linux, or another suitable system. The operating system enables a user to generate and manipulate a target window on a desktop. The desktop image data comprising the target window is output to the image processing hardware 220. The target window preferably comprises image data which will be replaced with video image data from the video image data sources 210a and b by the image processing hardware 220. The image data from the video computing device 230 comprises the first layer image of the final displayed image. The video image data from the video image data sources 210a and b represent the second layer of image data that is displayed over the first layer in a target display window.

The image processing hardware 220 is preferably in communication with a first video output device 240a and a second video output device 240b via suitable video data cables such as discussed above. The video output devices 240a and b may be selected from devices such as video monitors, video projectors, plasma displays, LCDs, CRTs, or other suitable display devices. In an exemplary embodiment of the present invention, the system 200 may comprise video projectors as output devices 240a and b, and a display screen 250 onto which the projectors display an image. In further contemplated embodiments, a single display device may be used.

In an exemplary embodiment, the video image data sources 210a and b are preferably computing devices substantially similar to computing device 110. Each of video image data sources 210a and b may function as a computer implementing a graphics system such as Open GL. Each of the video image data sources 210a and b may generate a separate image representative of a different viewpoint of a virtual environment. The images preferably represent adjacent viewpoints that can be combined into a single larger image of the virtual environment. The combination of these images is accomplished by the video processing system 300 as discussed in detail below.

In an alternative embodiment, video image data sources 210a and b comprise compression hard- or software, sending a compressed part of a larger image to the image processing hardware.

Figure 3A:
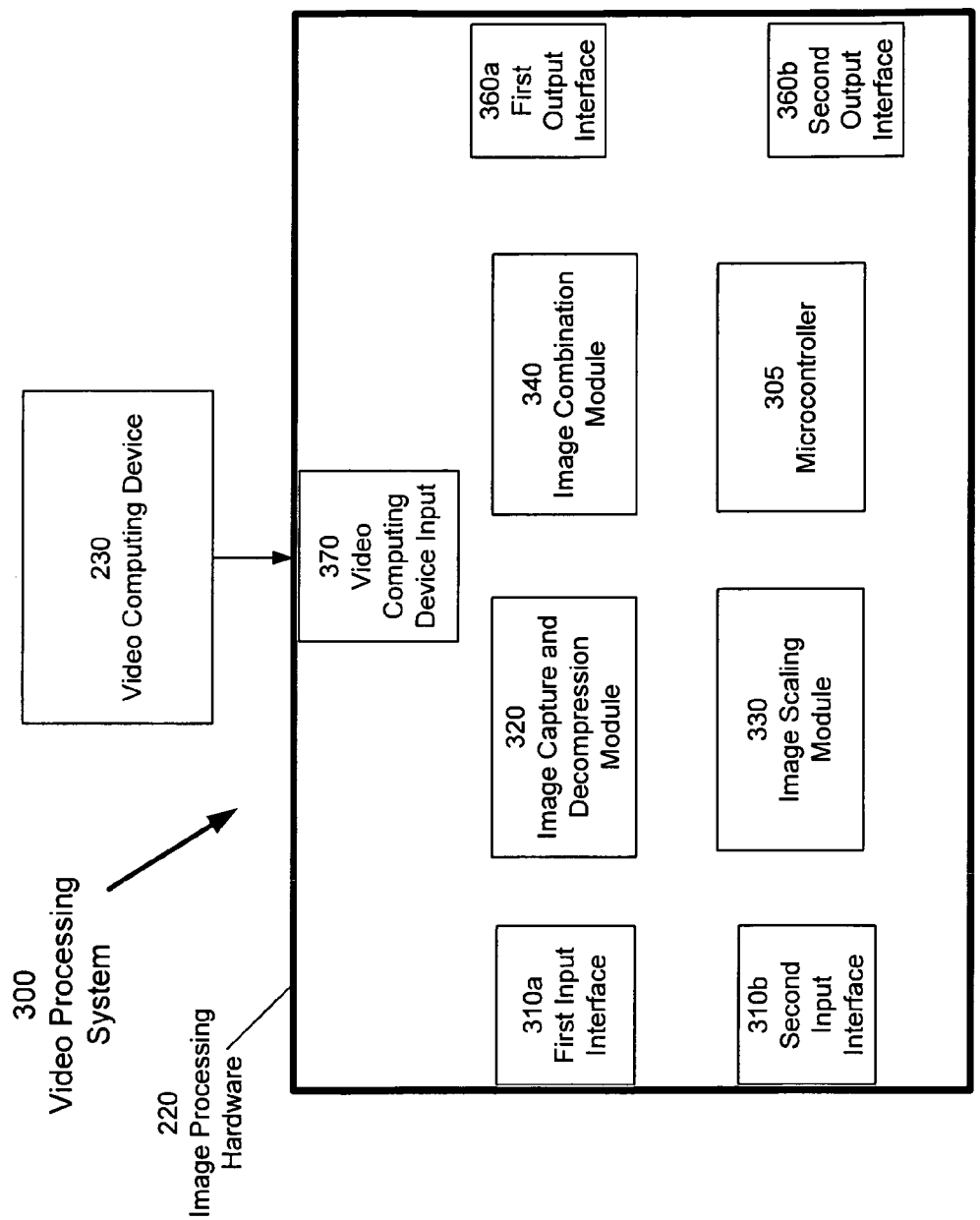
FIG. 3a illustrates a block diagram of the video image processing system according to an embodiment of the present invention.

The image processing hardware 220 and video computing device 230 preferably form the video processing system 300 that processes the video images generated by the video image data sources 210a and b and combines them in the target window on the desktop output by the video computing device 230. As shown in FIG. 3a, the image processing hardware 220 of the video processing system 300 according to an embodiment of the present invention preferably comprises a first video input interface 310a and a second input interface 310b. The first and second input interfaces 310a and b may be adapted to couple with the video data cables discussed above to receive video data from video image data sources 210a and b. In other contemplated embodiments, additional interfaces may be employed to match any additional contemplated video image data sources as discussed above.

The image processing hardware 220 preferable further includes an image capture and decompression module 320. The image capture and decompression module 320 preferably receives video image data from the video image data sources 210a and b and converts the data into a format for scaling and combining the separate images into a single image. Preferably there is an image capture and decompression module 320 for receiving video image data from each of the video image data sources 210a and b. In case of analog video signals, the image capture and decompression module 320 will sample the analog signal and convert it into digital information in a form suitable for the image scaling module 330. In case of a compressed digital image, the image capture and decompression module 320 will decompress the image and provide it in a suitable form to the image scaling module 330.

The image processing hardware 220 may further include an image scaling module 330. The image scaling module 330 scales each video image received from the video image data sources 210a and b to the size and resolution of the portion of the target window in which it will be displayed. For example, the target window may be substantially smaller than the video image that is received. In such an instance, the image scaling module rescales the image to reduce its size so that it fits within a portion of the target window. Similarly, if the aspect ratio of the target window is different from that of the received image, the rescaling module may adjust the aspect ratio of the image. In case the portion of the target window is bigger in resolution than the received video image, the image will be upscaled by interpolating the original pixels.

The video processing system 300 may further include an image combination module 340. The image combination module 340 preferably receives the separate images captured and scaled by the image capture and decompression module 320 and the image scaling module 330 from the video image data sources 210a and b and combines them into a single coherent image.

The image combination module 340 preferably receives video data representing the target window on the desktop into which the separate images are to be combined and inserted. The image combination module 340 preferably divides the target window into separate viewports, each viewport corresponding to one of the separate images that will be inserted into the target window. The image processing hardware 220 preferably further includes a microcontroller 305 for controlling the modules 320, 330, 340, and other operations.

The viewports are preferably arranged to correspond to the viewpoints represented by each of the separate images. For example, if two images are generated, the left viewport may be associated with the left image and the right viewport with the right image. A similar arrangement may be employed for any number of images generated by the video image data sources 210a and b. The size and shape of each viewport may be representative of the predetermined parameters of the images generated by each of the video image data sources 210a and b.

The image combination module 340 recognizes which portion of the larger image is represented by each individual image that is received. The image combination module 340 then inserts each image into the appropriate viewport. Because the images have preferably been scaled by the image scaling module 330 to correspond to the parameters of the target window, the images may be displayed in the viewports without need for further aligning or manipulating the individual images to form a larger image. The images are inserted into the appropriate viewport of the target window by replacing the image data of the target window with the separate images from the video image data sources 210a and b. When more than one target window is employed, each window can have a Z-value or other means of indicating which window is displayed on top of the other one for vertical layering.

Figure 3B:
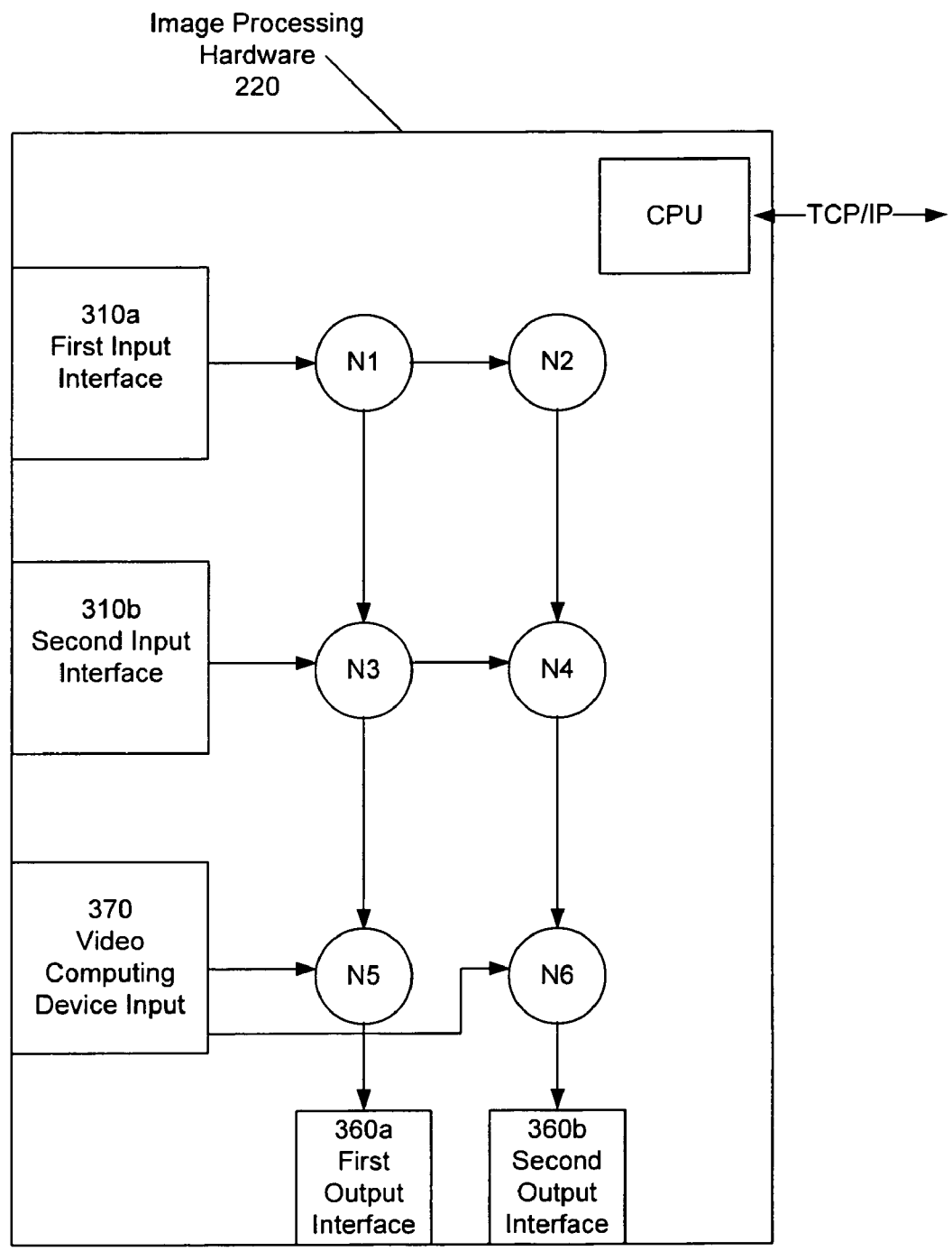
FIG. 3b illustrates a block diagram of the video image processing hardware according to an embodiment of the present invention.

FIG. 3b illustrates a block diagram of the video image processing hardware 220 according to an embodiment of the present invention. The functions of the image processing hardware 220 described above are preferably subdivided for each of the output channels. For example, there may be two output channels corresponding to first and second video output devices 240a and b. Each of the channels represents a portion of the total image that will be displayed. For example, the first channel may represent the left portion of the image and the second channel the right portion. Accordingly, video data from the video image data sources 210a and b is received by the image processing hardware 220 by the first and second input interfaces 310a and b. The image data is then separated into channel streams according to which channel the portion of the target window associated with the video data will be displayed in. If the target window is displayed in both the first and second channel, video data will be split and sent to the first and second channel stream according to which portion of the target window it is associated. The first node N1 and the second node N2 represent the input from the first video image data source 210a into the image channel stream of the data. Similarly, the third and fourth nodes N3, N4 represent the input from the second video image data source 210b into the image channel stream of the data. The fifth and sixth nodes N5, N6 represent the input from video computing device 230 received by the video computing device input 370 into the image channel stream of data. The image data from the video computing device may already be divided into separate channels and received by separate inputs or arrive at the image processing hardware 220 in a single stream and require that the image processing hardware divide the data into separate streams and direct it to the appropriate nodes. Preferably, there is a separate image scaling module 330 and image combination module 340 per video image data source and output channel at each node. Therefore, if two video image data sources are employed and two channels are used for the two video output devices, a total of four image scaling modules 330 and image combination modules 340 are necessary. In other contemplated embodiments, fewer or more streams may be employed corresponding to the desired number of video output devices, as well as fewer or more input interfaces 310 may be present.

Figure 4:
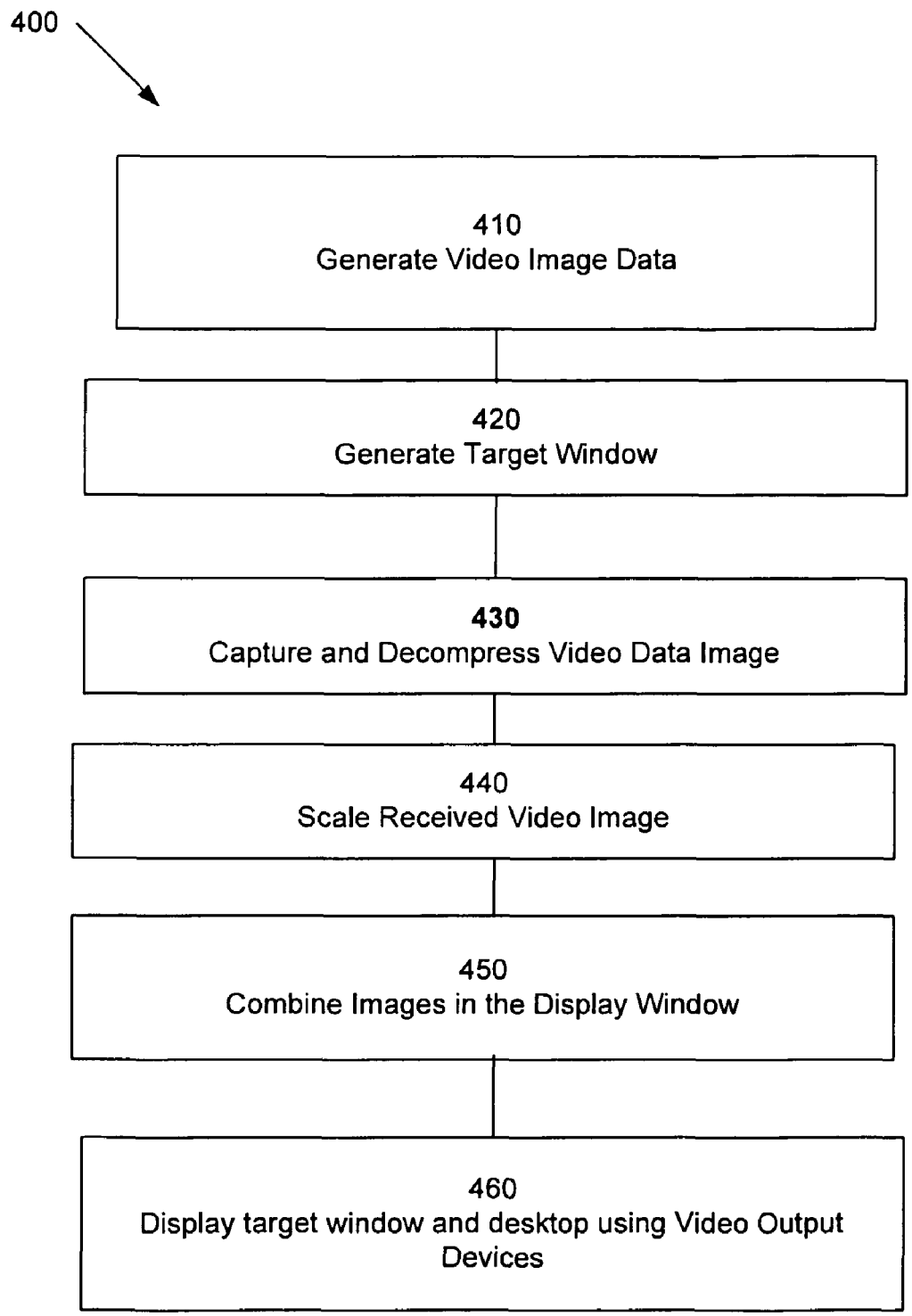
FIG. 4 illustrates a flowchart of a method of processing and combining a video image according to an embodiment of the present invention.

FIG. 4 illustrates a flowchart 400 of a method of processing and combining a video image according to an embodiment of the present invention. At 410 the video image data sources 210a and b generate video image data. The video image data preferably comprises separate video images, each generated by one of the video image sources 210a and b. Each of the video images may form a portion of a larger image and may be compressed before transferring to the video processing hardware.

Figure 5:
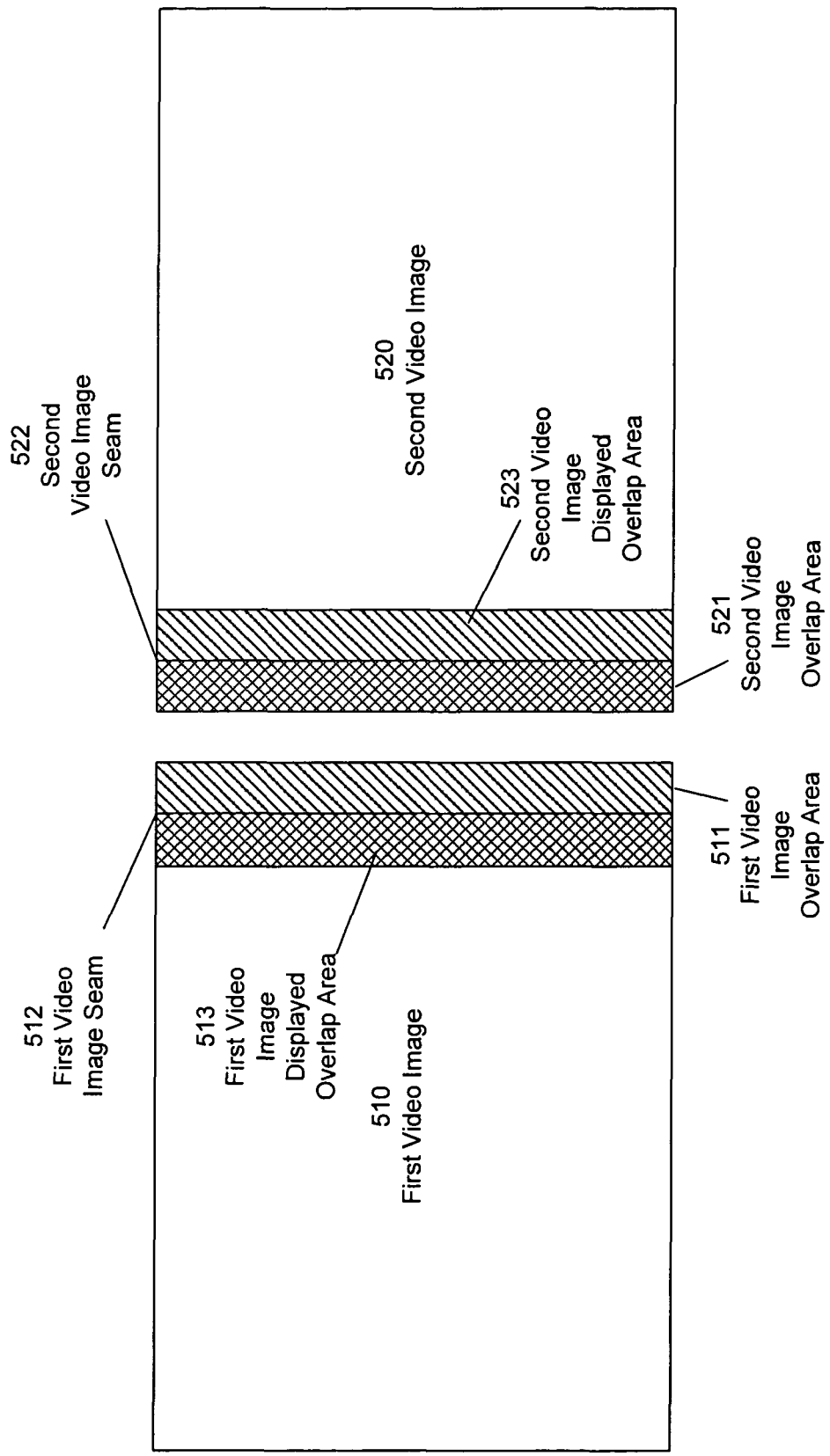
FIG. 5 illustrates exemplary video images generated by the video image data sources according to an embodiment of the present invention.

FIG. 5 illustrates exemplary video images generated by the video image data sources 210a and b according to an embodiment of the present invention. For example, if a large image is desired, the first video output source 210a may generate a first video image 510 representing the left portion of the image and the second video output source 210b may generate a second video image 520 representing the right portion of the desired image. Each of the first video image 510 and second video image 520 comprise video data representing more than half of the desired image. The additional video data is represented by video image overlap areas. Each of the video image overlap areas comprises two separate areas. The first video image 510 comprises a first video image overlap area 511 and a first video image displayed overlap area 513. Similarly, the second video image 520 comprises a second video image overlap area 521 and a second video image displayed overlap area 523. The first video image displayed overlap area 513 comprises the same video image data as the second video image overlap area 521. Similarly, the second video image displayed overlap area 523 comprises the same video data as the first video image overlap area 511. The overlap areas 511 and 521 of the video images 510 and 520 comprise redundant data that is not displayed, but is retained for pixel data interpolation during rescaling as described in greater detail below. The video image displayed overlap areas 513 and 523 represent data contained in both the video image 510 and 520 that is displayed to form a complete image. The border between the video image displayed overlap areas 513 and 523 and the video image overlap areas 511 and 521 comprises the first video image seam 512 and second video image seam 522. The video images 510 and 520 are combined in a manner that the first video image seam 512 and second video image seam 522 coincide to form a single image. For example, the video images 510 and 520 may be positioned alongside each other with the first video image seam 512 coinciding the second video image seam 522, with the first video image displayed overlap area 513 overlaid atop the second video image overlap area 521 and the second video image displayed overlap area 523 overlaid atop the first video image overlap area 511.

At 420 the video processing system 300 generates a target window. The target window is preferably a window of a windows based operating system environment. The target window preferably comprises image data that will be replaced with image data by the image processing hardware 220. The window decoration 630 of the target window 600 may or may not be present (so called "borderless" window). The user may manipulate and resize the target window like any normal window in a windows based operating system. In other contemplated embodiments, more than one target window may be generated. In such an embodiment, each target window preferably comprises image data that will be replaced with the video images 510 and 520 from the video image data sources 210a and b. Further, each target window preferably also comprises a Z-value or other means for presenting its position relative to the other target window. For example, the Z-value may indicate whether one target window is atop another target window.

Figure 6A:
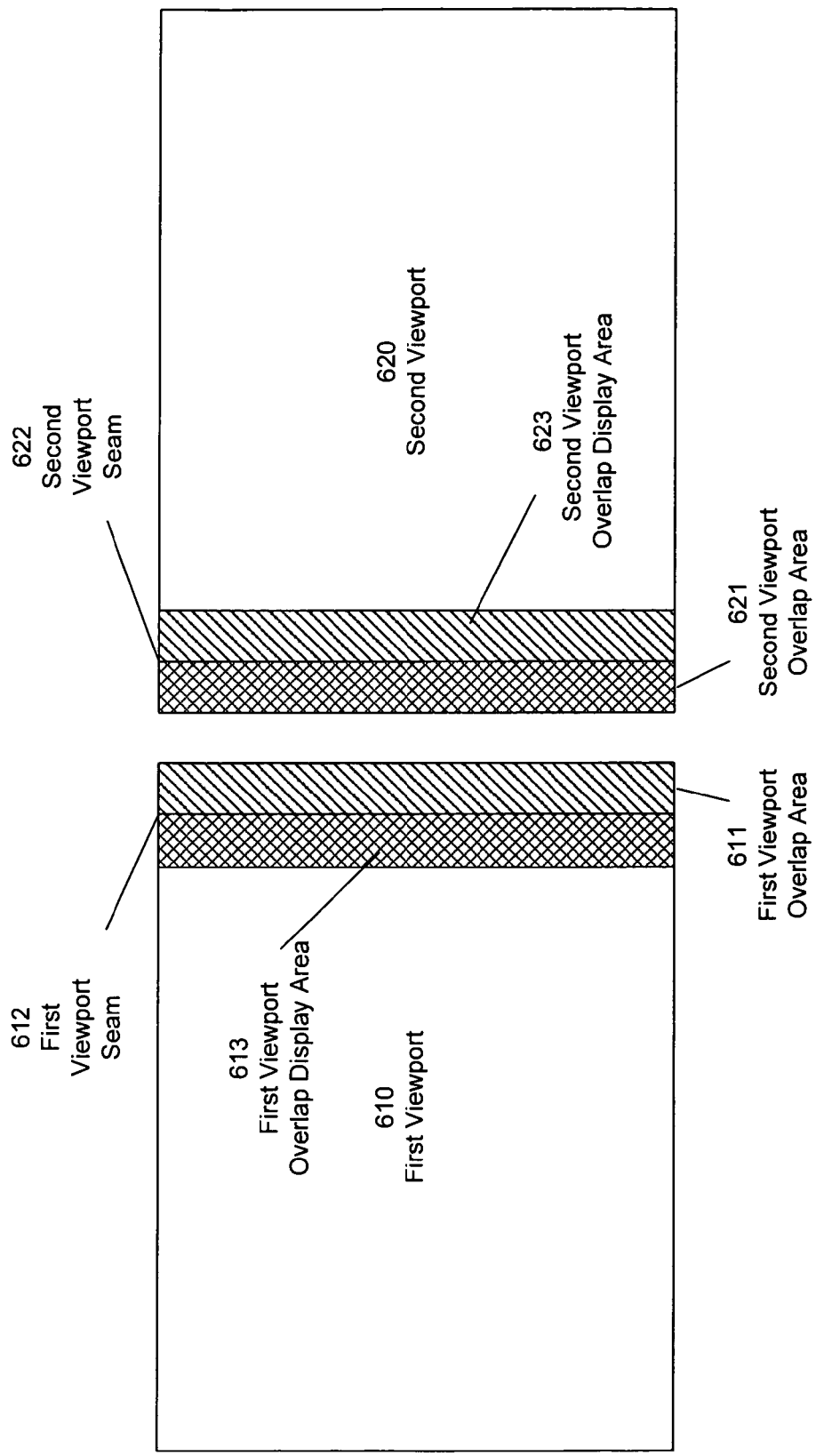
FIG. 6a illustrates viewports according to an exemplary embodiments of the present invention.

FIG. 6a illustrates viewports according to an exemplary embodiment of the present invention. In an exemplary embodiment a first view port 610 and a second viewport 620 may be employed. The first and second viewports 610 and 620 substantially correspond to the first and second video images 510 described above in relation to FIG. 5, though resolution and aspect ration may differ. The first viewport 610 may comprise a first viewport overlap display area 613 for displaying the portion of the image represented by first video image displayed overlap area 513. Further, the first viewport 610 may have a first viewport overlap area 611 for retaining the portion of the first video image 510 represented by the first video image overlap area 511. A first viewport seam 612 may form the border between the first viewport overlap display area 613 and the first viewport overlap area 611. Similarly the second viewport 620 may comprise a second viewport overlap display area 623 and second viewport overlap area 621 corresponding to the second video image displayed overlap area 523 and second video image overlap area 521 of the second video image 520. Further, a second viewport seam 622 can form the border between second viewport overlap display area 623 and second viewport overlap area 621.

Figure 6B:
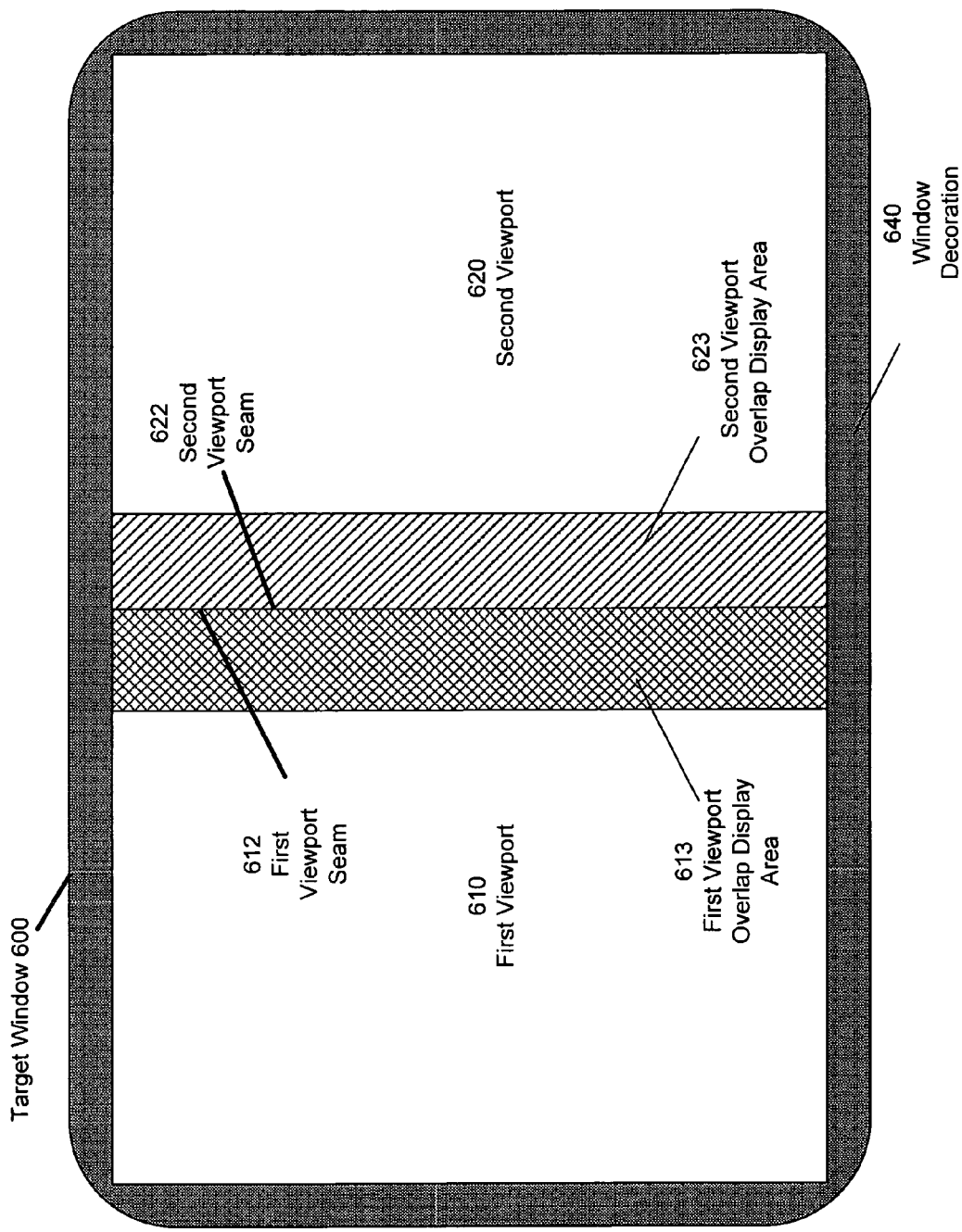
FIG. 6b illustrates a viewports displayed in a target window according an exemplary embodiment of the present invention.

FIG. 6b illustrates viewports displayed in a target window 600 according an exemplary embodiment of the present invention. The target window 600 may comprise a first viewport 610 and a second viewport 620. Each of the viewports 610 and 620 are preferably larger in area than half the display area of the target window 600. The viewport overlap area 611 and 621 are preferably not displayed in the target window 600. The viewports 610 and 620 are preferably aligned along the first viewport seam 612 and second viewport seam 622. A scaled first video image 510 can be displayed in the first viewport 610. In particular, the first video image displayed overlap area 513 can be displayed in the first viewport overlap display area 613. Similarly, a scaled second video image 520 may be displayed in the second viewport 620 with the second video image displayed overlap area 523 displayed in the second viewport display overlap area 623. In this manner, the left and right portions of a single coherent image may be combined displayed in the first and second viewports 610 and 620.

The relative positions of the viewports 610 and 620 may be fixed in with respect to the target window 600. Moving the display window 600 around the screen may result in moving the viewports 610 and 620 as well. The viewports 610 and 620 may also remain in the same position within the target window 600. Once a viewport is assigned to a portion of the display are of the target window 600, further changes to the target window 600 will not alter the position of the viewport relative to the target window 600. For example, if the first viewport 610 is assigned to the left half of the display area of the display window, if the target window 600 is flipped, rotated, or its position otherwise changes, the position of the first viewport 610 will change with the display window 600. Thus, video images 510 and 520 move relative to the desktop along with the target window 600.

Further, the shape and size of the viewports 610 and 620 is fixed with respect to the display window 600. Changes made by the user to the size and shape of the target window 600 will result in corresponding changes to the size and shape of the viewports 610 and 620. If the target window 600 is enlarged, reduced, narrowed, lengthened, stretched, or its parameters and aspect ratio otherwise changed, the viewports 610 and 620 will undergo a corresponding change. For example, if the width of the display window is reduced by 50 percent while the height remains constant, each of the viewports 610 and 620 will also be reduced in width by 50 percent and their height will remain constant. The video images 510 and 520 received from the each of video image data sources 210a and b may be scaled by the image scaling module 330 of the video processing system 300 to fit the resized viewports 610 and 620 in a manner discussed in greater detail below.

At 430 the video images 510 and 520 received from the each of the video image data sources 210a and b are preferably captured and/or decompressed. Capturing and or decompressing the video images 510 and 520 comprises receiving the images and converting the data into a format that may be scaled and combined by the image processing hardware 220. Although the video images from the video image data sources 210a and b might be parts of a single larger image, their resolutions can be different.

At 440 the video images 510 and 520 received from the each of the video image data sources 210a and b are preferably scaled. Each of the images 510 and 520 is preferably scaled separately. The images may be scaled by the image scaling module 330 of the video processing system 300 to fit within the corresponding viewports 610 and 620 of the target window 600. For example, the first video image 510 from the first video output source 210a may be scaled so that it can be displayed in the first viewport 610. Similarly, the second video image 520 from the second video output source 210b may be scaled so that it can be displayed in the second viewport 620. Scaling the images may involve changing the size and/or aspect ratio of the image. Preferably, the entire images including the video image overlap areas 511 and 521 are scaled such that the images fit within the respective viewports 610 and 620 as described above. Continued scaling may be necessary as the user of the video computing device 230 changes the parameters of the target window 600.

Any change to the size or resolution of the target window 600 requires a corresponding change to the size and resolution of the video images 510 and 520. Such changes will result in the new combined image having a different number of pixels.

The color assigned to each new pixel of the changed image may be interpolated from the original image. This interpolation may be performed by the image scaling module 330. The interpolation may be performed by analyzing pixel data of the pixels in the area of the original image corresponding to the position of the new pixel. For example, for the new pixel that is located in the center of the new image, the processing module may analyze the pixel data assigned to the center pixel and adjacent pixels of the original image. This process accurately assigns pixel data to new pixels provided that there is sufficient information relating to the corresponding pixels of the original image. The accuracy of this interpolation decreases for pixels that are located at the borders of the image since the border pixels of the original image have fewer adjacent pixels from which pixel data may be utilized. A pixel located within an image has eight adjacent pixels. A pixel located at the border of an image, however, has only five adjacent pixels. The result is that the borders of the newly resized image may not accurately reflect the color of the borders of the original image. This problem is generally not noticeable. However, when several images are combined to form a larger image, the borders of each individual image must be aligned. As a result an artifact may appear at the seam of the combined images resulting from the borders of the individual images having inaccurately assigned pixel colors.

The interpolation performed by the image scaling module 330 preferably does not produce the artifacts described above. The border pixels at the seam of the original video images 510 and 520 have sufficient adjacent pixels enabling an accurate color interpolation for the new border pixels of the resized image. The border pixels at the seams of original images 510 and 520 have additional pixels in the image overlap areas 511 and 521, that while not displayed as part of the combined image may be utilized for pixel data interpolation for the pixels located at the seams of the new resized combined image.

Figure 7:
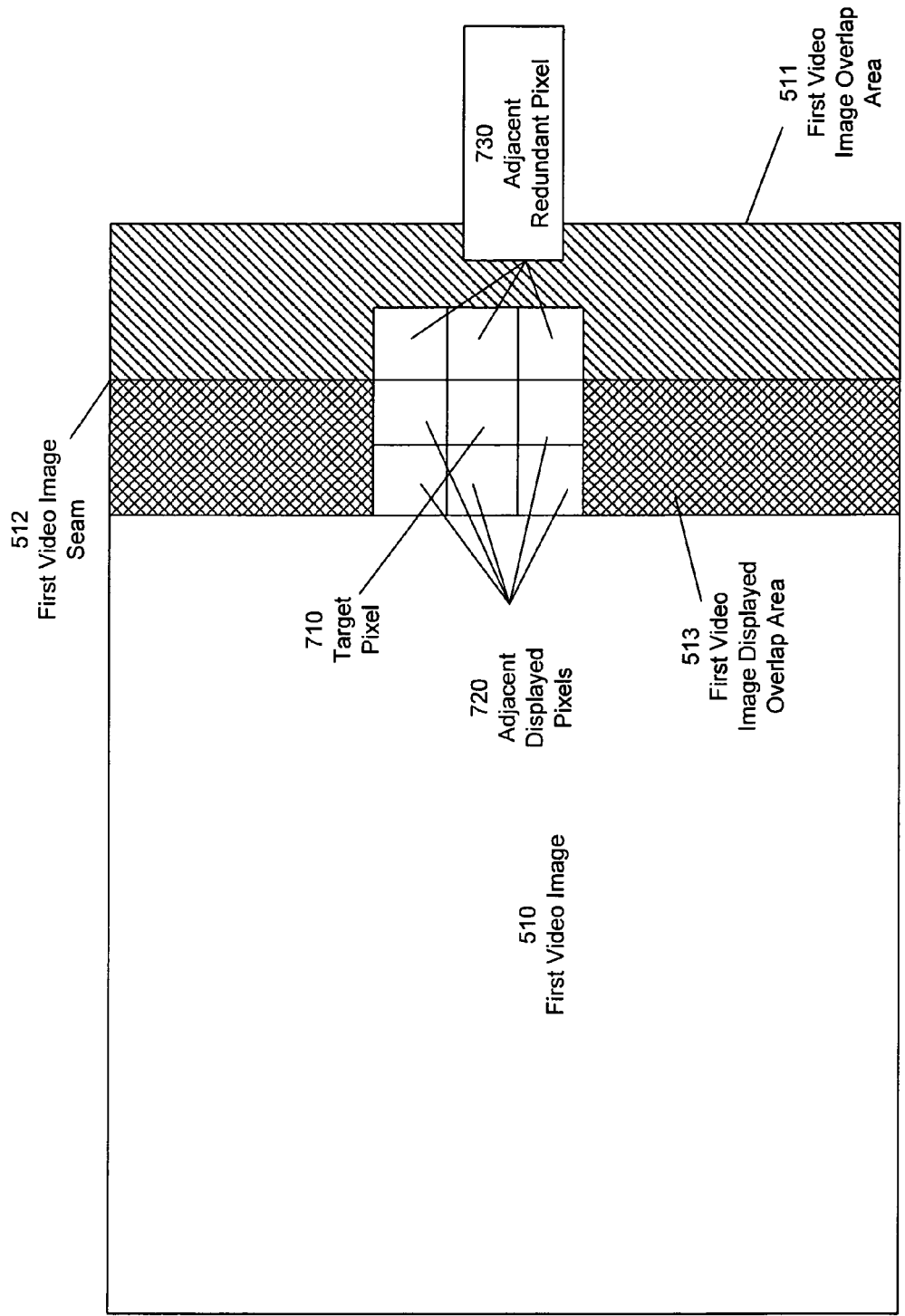
FIG. 7 illustrates the image pixels at the seam of an image according to an exemplary embodiment of the present invention.

FIG. 7 illustrates the image pixels at the seam of an image according to an exemplary embodiment of the present invention. The first video image 510 represents the original image prior to resizing or changing of the resolution by the user. When the image 510 is rescaled, the image scaling module 330 interpolates the appropriate pixel data for each pixel of the new image. For example, a particular pixel may be located in an area at the seam of the new image corresponding to the area of the original image occupied by a target pixel 710. The size of such pixel could for example be smaller than target pixel 710 in case the new image has a higher resolution than the original image 510. The target pixel 710 may be located along the first video image seam 512 of the first video image 510. The interpolation of the pixel data of the particular new pixel may be based on the pixel data of the target pixel 710 and pixels adjacent to it dependent on the position of the new pixel within the overlap area. As discussed above, conventional border pixels have only five adjacent pixels. The target pixel 710, however, located at the border in the first video image displayed overlap area 513 along the first video image seam contains additional non-displayed video data in the first video image overlap area 511. As a result, the target pixel 710 has five adjacent display pixels 720 and an additional three adjacent redundant pixels 730 located in the first video image overlap area 511. A similar arrangement is present in the second video image 520. Therefore, an accurate interpolation of the pixels located along the seam 512 may be performed by the image scaling module 330, eliminating the artifact conventionally present when the size or resolution of two combined images is separately changed.

At 450 the video images 510 and 520 received from each of the video image data sources 210a and b and scaled by the image scaling module 330 may be combined in the target window 600. Each of the images 510 and 520 are preferably inserted in the corresponding viewports 610 and 620. The images 510 and 520 have preferably been rescaled to fit the corresponding viewports 610 and 620, and preferably do not require further adjustments. For example, if video images 510 and 520 are adjacent horizontally, preferably the images 510 and 520 are already aligned vertically.

The video images 510 and 520 may be inserted directly into the viewports 610 and 620. As discussed above, the video images 510 and 520 are preferably scaled to fit exactly within the viewports 610 and 620 without any cropping of the image or further resizing. As a result of the scaling, the displayed image overlap areas 513 and 523 are preferably the same size as the viewport overlap display areas 613 and 623. Similarly, the image overlap areas 511 and 521 are the same size as the viewport overlap area 611 and 621. This allows for the viewable portions of the video image 510 and 520 to be easily combined to form a single coherent image by inserting the images 510 and 520 into the corresponding viewports 610 and 620.

At 460 the video processing system 300 utilizes the first video output device 240a and the second video output device 240b to display the combined image. The video processing system 300 may comprise a first video output interface 360a and a second video output interface 360b. The video output interfaces 360a and b may be in communication with the output devices 240a and 240b and adapted to transmit the image data generated by the video processing system to the output devices 240a and 240b.

The output devices 240a and 240b preferably display the desktop of the video computing device 230 along with the target window 600 with inserted video images 510 and 520. The video output devices 240a and b may be monitors, video projectors, plasma displays, LCDs, CRTs, or other suitable display devices as discussed above. In an exemplary embodiment of the present invention, the system 200 may comprise video projectors as output devices 240a and b, and a display wall 250 onto which the projectors display an image.

While the various embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all applicable equivalents.

What is claimed is:

1. A system for processing image data, the system comprising:
   an image processing hardware device having a processing device selected from the group consisting of a central processing unit (CPU), microcontroller, microprocessor, application-specific integrated circuit (ASIC), a digital signal processor (DSP), system-on-a-chip (SoC), field-programmable gate array (FPGA), programmable-logic device (PLD), programmable electrically erasable logic (PEEL), programmable array logic (PAL), and generic array logic (GAL), the processing device for receiving and processing a first video image and a second video image, the first video image having first video image parameters and the second video image having second video image parameters;
   a video computing device running a windows based operating system and having a processing unit for generating a target window having target window parameters and defining a first viewport and a second viewport within the target window, the first viewport having first viewport parameters and the second viewport having second viewport parameters, the first and second viewport parameters associated with the target window parameters; and
   a first video image data source generating the first video image comprising a first overlap area and a second video image data source generating the second video image comprising a second overlap area, the first overlap area having image data present in the second overlap area;
   the image processing hardware and video computing device being in wireless or wired communication;
   the processing device interpolating first pixel data for the first video image from pixel data in at least one of the first overlap area and second overlap area dependent upon the position of a first pixel within the first overlap area and interpolating second pixel data for the second video image from pixel data in at least one of the first overlap area and second overlap area dependent upon the position of a second pixel within the second overlap area.

2. The system of claim 1, the image processing hardware device comprising an image capture module for receiving the first and second video images from a first video image data source and a second video image data source.

3. The system of claim 1, the image processing hardware device comprising an image scaling module for processing the first and second video images such that the first video image parameters correspond to the first viewport parameters and the second video image parameters correspond to the second viewport parameters.

4. The system of claim 1, the image processing hardware comprising an image combination module for inserting the first video image into the first viewport and the second video image into the second viewport.

5. The system of claim 1, the processing unit associating the first viewport parameters and second viewport parameters with the target window parameters by defining the dimensions and positions of the first and second viewports relative to the dimensions and position of the target window such that changes to the dimensions of the target window result in corresponding proportional changes to the dimensions of the first and second viewports, and movement of the target window results in corresponding movement of the first and second viewports.

6. The system of claim 1, the processing device inserting the first video image into the first viewport and the second video image into the second viewport.

7. A method for processing image data, the method comprising:
   receiving a first video image having first video image parameters and a second video image having second video image parameters;
   generating a target window having target window parameters with a processing unit of a video computing device running a windows based operating system;
   defining within the target window a first viewport having first viewport parameters and a second viewport having second viewport parameters;
   associating the first and second viewport parameters with the target window parameters;
   processing the first and second video images so that the first and second video image parameters correspond to the first and second viewport parameters respectively;
   inserting the first video image into the first viewport and the second video image into the second viewport; and
   displaying in the target window the first and second video images inserted in the first and second viewports the first video image having a first overlap area and the second video image having a second overlap area, the first overlap area comprising image data present in the second overlap area;

wherein processing the first and second video images comprising interpolating pixel data from pixel data in at least one of the first overlap area and pixel data in the second overlap area dependent upon the position of the pixel within the first and second overlap areas.

8. The method of claim 7, the first video image parameters, second video image parameters, first viewport parameters, second viewport parameters, and target window parameters defining at least one of the dimensions and resolution of the corresponding video image, viewport, or target window.

9. The method of claim 7, the first viewport having a first viewport overlap area corresponding to the first overlap area and the second viewport having a second viewport overlap area corresponding to the second overlap area.

10. The method of claim 9, further comprising overlaying the first and second viewports within the target window such that a portion of the first viewport overlap area is overlaid onto a portion of the second viewport overlap area and a portion of the second viewport overlap area is overlaid onto a portion of the first viewport overlap area.

11. The method of claim 7, associating the first and second viewport parameters with the target window parameters comprising defining the dimensions of the first and second viewports relative to the dimensions of the target window such that changes to the dimensions of the target window result in corresponding proportional changes to the dimensions of the first and second viewports, and movement of the target window results in corresponding movement of the first and second viewports.

12. The method of claim 7, processing the first and second video images further comprising adjusting the dimensions and resolution of the first video image to correspond to the dimensions and resolution of the first viewport and adjusting the dimensions and resolution of the second video image to correspond to the dimensions and resolution of the second viewport.

13. The method of claim 7, inserting the first and second video images into the first and second viewports comprising inserting the first and second video images to form a single coherent image in the first and second viewports.

14. The method of claim 7, further comprising capturing and decompressing the first and second video images.

15. The method of claim 7, wherein the first and second video images are generated by a first device and the target window and viewports are generated by a second device.

16. A system for processing image data comprising:
an image processing hardware device having a processing device for receiving and processing a first video image and a second video image, the first video image having first video image parameters and the second video image having second video image parameters;
a video computing device having a processing unit for generating a target window having target window parameters and defining a first viewport and a second viewport within the target window, the first viewport having first viewport parameters and the second viewport having second viewport parameters, the first and second viewport parameters associated with the target window parameters;
a first video image data source generating the first video image comprising a first overlap area; and
a second video image data source generating the second video image comprising a second overlap area, the first overlap area having image data present in the second overlap area;
the processing device interpolating first pixel data for the first video image from pixel data in at least one of the first overlap area and second overlap area dependent upon the position of a first pixel within the first overlap area and interpolating second pixel data for the second video image from pixel data in at least one of the first overlap area and second overlap area dependent upon the position of a second pixel within the second overlap area.

17. The system of claim 16, the image processing hardware device comprising an image capture module for receiving the first and second video images from the first video image data source and the second video image data source.

18. The system of claim 16, the image processing hardware device comprising an image scaling module for processing the first and second video images such that the first video image parameters correspond to the first viewport parameters and the second video image parameters correspond to the second viewport parameters.

19. The system of claim 16, the image processing hardware comprising an image combination module for inserting the first video image into the first viewport and the second video image into the second viewport.

20. The system of claim 16, the processing unit associating the first viewport parameters and second viewport parameters with the target window parameters by defining the dimensions and positions of the first and second viewports relative to the dimensions and position of the target window such that changes to the dimensions of the target window result in corresponding proportional changes to the dimensions of the first and second viewports, and movement of the target window results in corresponding movement of the first and second viewports.

21. The system of claim 16, the processing device inserting the first video image into the first viewport and the second video image into the second viewport.

22. A method for processing image data comprising:
receiving a first video image having first video image parameters and a second video image having second video image parameters, the first video image having a first overlap area and the second video image having a second overlap area, the first overlap area comprising image data present in the second overlap area;
generating a target window having target window parameters;
defining within the target window a first viewport having first viewport parameters and a second viewport having second viewport parameters;
associating the first and second viewport parameters with the target window parameters;
processing the first and second video images so that the first and second video image parameters correspond to the first and second viewport parameters, respectively, by interpolating pixel data from pixel data in at least one of the first overlap area and pixel data in the second overlap area dependent upon the position of the pixel within the first and second overlap areas;
inserting the first video image into the first viewport and the second video image into the second viewport; and
displaying in the target window the first and second video images inserted in the first and second viewports.

23. The method of claim 22, the first video image parameters, second video image parameters, first viewport parameters, second viewport parameters, and target window parameters defining at least one of the dimensions and resolution of the corresponding video image, viewport, or target window.

24. The method of claim 22, the first viewport having a first viewport overlap area corresponding to the first overlap area and the second viewport having a second viewport overlap area corresponding to the second overlap area.

25. The method of claim 24 further comprising overlaying the first and second viewports within the target window such that a portion of the first viewport overlap area is overlaid onto a portion of the second viewport overlap area and a portion of the second viewport overlap area is overlaid onto a portion of the first viewport overlap area.

26. The method of claim 22, wherein associating the first and second viewport parameters with the target window parameters comprises defining the dimensions of the first and second viewports relative to the dimensions of the target window such that changes to the dimensions of the target window result in corresponding proportional changes to the dimensions of the first and second viewports, and movement of the target window results in corresponding movement of the first and second viewports.

27. The method of claim 22, wherein processing the first and second video images further comprises adjusting the dimensions and resolution of the first video image to correspond to the dimensions and resolution of the first viewport and adjusting the dimensions and resolution of the second video image to correspond to the dimensions and resolution of the second viewport.

28. The method of claim 22, wherein inserting the first and second video images into the first and second viewports comprises inserting the first and second video images to form a single coherent image in the first and second viewports.

29. The method of claim 22 further comprising capturing and decompressing the first and second video images.

30. The method of claim 22, wherein the first and second video images are generated by a first device and the target window and viewports are generated by a second device.

* * * * *